(12) United States Patent
Vivalda et al.

(10) Patent No.: US 10,057,108 B2
(45) Date of Patent: Aug. 21, 2018

(54) SYSTEMS, DEVICES, AND METHODS FOR EXCHANGING AND PROCESSING DATA MEASURES AND OBJECTS

(71) Applicant: Decisyon, Inc., Stamford, CT (US)

(72) Inventors: Antonio Vivalda, Latina (IT); Fabrizio Del Franco, Latina (IT); Simone Costantini, Velletri (IT); Alessandro Praticò, Latina (IT); Franco Petrucci, Sabaudia (IT)

(73) Assignee: Decisyon, Inc., Stamford, CT (US)

( * ) Notice: Subject to any disclaimer, the term of this patent is extended or adjusted under 35 U.S.C. 154(b) by 229 days.

(21) Appl. No.: 15/195,966

(22) Filed: Jun. 28, 2016

(65) Prior Publication Data

US 2017/0033972 A1    Feb. 2, 2017

Related U.S. Application Data

(63) Continuation of application No. PCT/US2014/072833, filed on Dec. 30, 2014.

(60) Provisional application No. 61/923,139, filed on Jan. 2, 2014, provisional application No. 62/062,719, filed on Oct. 10, 2014.

(51) Int. Cl.
  *G06F 15/16*  (2006.01)
  *H04L 12/24*  (2006.01)
  *H04L 29/06*  (2006.01)

(52) U.S. Cl.
  CPC ...... *H04L 41/0233* (2013.01); *H04L 65/4015* (2013.01)

(58) Field of Classification Search
  CPC .................................................. G06F 17/30592
  See application file for complete search history.

(56) References Cited

U.S. PATENT DOCUMENTS

| | | | |
|---|---|---|---|
| 6,438,566 | B1 | 8/2002 | Okuno et al. |
| 7,039,569 | B1 | 5/2006 | Haws et al. |
| 7,072,940 | B1 | 7/2006 | Day et al. |
| 7,386,535 | B1 | 6/2008 | Kalucha et al. |
| 7,925,985 | B2 | 4/2011 | Moore |

(Continued)

OTHER PUBLICATIONS

International Search Report and Written Opinion for International Application No. PCT/US2014/023753, dated Aug. 26, 2014, in 11 pages.

(Continued)

*Primary Examiner* — Hamza N Algibhah
(74) *Attorney, Agent, or Firm* — Knobbe, Martens, Olson & Bear, LLP

(57) ABSTRACT

This disclosure in part describes systems, devices, and methods for exchanging and processing data measures and objects to enable collaboration between systems through network interfaces. In one embodiment, multiple systems communicate with one another via a computer network using communication objects, which can reduce disconnection inefficiencies in network communication between the multiple systems. The generation, transmission, and processing of such communication objects enables an ecosystem of networked systems to dynamically be created, supported, and evolve so as to facilitate improved collaboration between organizations utilizing the networked systems. The communication objects additionally enable the communication of data between systems with a limited number of user inputs.

15 Claims, 9 Drawing Sheets

(56) References Cited

U.S. PATENT DOCUMENTS

| | | | |
|---|---|---|---|
| 8,407,664 B2 | 3/2013 | Moosmann et al. | |
| 8,719,217 B1* | 5/2014 | Vivalda | G06F 17/30914 707/607 |
| 9,081,845 B2 | 7/2015 | Vivalda et al. | |
| 9,830,402 B2* | 11/2017 | Vivalda | G06F 17/30592 |
| 2002/0154120 A1 | 10/2002 | Cullimore et al. | |
| 2004/0187140 A1 | 9/2004 | Aigner et al. | |
| 2005/0097440 A1 | 5/2005 | Lusk et al. | |
| 2005/0203876 A1 | 9/2005 | Cragun et al. | |
| 2005/0256825 A1 | 11/2005 | Dettinger et al. | |
| 2006/0004885 A1 | 1/2006 | Lubashev et al. | |
| 2006/0242581 A1 | 10/2006 | Manion et al. | |
| 2008/0034283 A1 | 2/2008 | Gragun et al. | |
| 2008/0091706 A1 | 4/2008 | Suzuki et al. | |
| 2008/0115083 A1 | 5/2008 | Finkelstein et al. | |
| 2008/0147718 A1 | 6/2008 | Dettinger et al. | |
| 2008/0222512 A1 | 9/2008 | Albornoz et al. | |
| 2008/0256062 A1 | 10/2008 | Dettinger et al. | |
| 2008/0256172 A1 | 10/2008 | Hebert et al. | |
| 2008/0288889 A1 | 11/2008 | Hunt et al. | |
| 2009/0070350 A1 | 3/2009 | Wang | |
| 2009/0089682 A1 | 4/2009 | Baier et al. | |
| 2009/0234876 A1 | 9/2009 | Schigel et al. | |
| 2009/0287675 A1* | 11/2009 | Dorrell | G06Q 10/06 |
| 2010/0058166 A1 | 3/2010 | Chikyu | |
| 2010/0114862 A1 | 5/2010 | Young et al. | |
| 2010/0268103 A1 | 10/2010 | McNamara et al. | |
| 2010/0287195 A1 | 11/2010 | Geurts et al. | |
| 2012/0066204 A1 | 3/2012 | Ball et al. | |
| 2012/0084250 A1 | 4/2012 | Gundorov et al. | |
| 2012/0112997 A1 | 5/2012 | Becerra et al. | |
| 2012/0259901 A1 | 10/2012 | Lee et al. | |
| 2013/0061155 A1 | 3/2013 | Hon | |
| 2013/0159926 A1 | 6/2013 | Vainer et al. | |
| 2014/0101093 A1* | 4/2014 | Lanphear | G06F 17/30563 707/602 |
| 2014/0172775 A1* | 6/2014 | Niehoff | G06F 17/30289 707/600 |
| 2014/0172827 A1* | 6/2014 | Nos | G06F 17/30424 707/722 |
| 2014/0250053 A1* | 9/2014 | Averbuch | G06F 17/30592 707/600 |
| 2014/0279832 A1 | 9/2014 | Vivalda et al. | |
| 2014/0337274 A1* | 11/2014 | Unnikrishnan | G06N 5/047 706/48 |
| 2014/0372924 A1* | 12/2014 | Shih | G06F 3/0484 715/769 |
| 2015/0073961 A1* | 3/2015 | Cristoforo | G06Q 40/04 705/37 |
| 2015/0278392 A1 | 10/2015 | Vivalda et al. | |
| 2015/0331928 A1* | 11/2015 | Ghaemi | G06F 17/30589 707/602 |
| 2016/0103903 A1* | 4/2016 | Vivalda | G06F 17/30592 709/204 |
| 2016/0103930 A1 | 4/2016 | Vivalda et al. | |

OTHER PUBLICATIONS

International Search Report and Written Opinion for International Application No. PCT/US2014/072833, dated Mar. 27, 2015, in 9 pages.

* cited by examiner

SYSTEMS, DEVICES, AND METHODS FOR EXCHANGING AND PROCESSING DATA MEASURES AND OBJECTS

INCORPORATION BY REFERENCE TO ANY PRIORITY APPLICATIONS

This application is a continuation of PCT Application No. PCT/US2014/072833, filed Dec. 30, 2014, and entitled "SYSTEMS, DEVICES, AND METHODS FOR EXCHANGING AND PROCESSING DATA MEASURES AND OBJECTS," which claims the benefit under 35 U.S.C. § 119(c) of U.S. Provisional Application No. 61/923,139, filed Jan. 2, 2014, and entitled "SYSTEMS, DEVICES, AND METHODS FOR GENERATION OF CONTEXTUAL OBJECTS MAPPED BY DIMENSIONAL DATA TO DATA MEASURES," and which also claims the benefit under 35 U.S.C. § 119(c) of U.S. Provisional Application No. 62/062,719, filed Oct. 10, 2014, and entitled "SYSTEMS, METHODS, AND DEVICES FOR DATA MANAGEMENT, PRESENTATION, AND COLLABORATION." All of the foregoing applications are hereby incorporated herein by reference in their entirety under 37 C.F.R. § 1.57.

BACKGROUND

Field

The embodiments of this disclosure generally relate to data measures in collaboration systems, and more particularly to systems, devices, and methods for exchanging and processing data measures and objects to enable collaboration between networked systems.

Description of the Related Art

With the development of new information technologies, users and organizations are creating vast amounts of data. Such data is usually stored in various databases that are often separated into distinct silos. The storage of such data in separate silos often makes it difficult to share data between users or between organizations or between networks of systems. The difficulty in sharing data inhibits the ability of users or organizations to collaborate efficiently. Accordingly, collaborative software systems, also known as groupware, have been developed to help individuals share data in order to collaborate and achieve common tasks or goals.

SUMMARY

In an embodiment, a computer-implemented method is disclosed for facilitating collaboration between users of a plurality of user terminals around a data measure mapped to a multi-dimensional data model. The computer-implemented method can include: receiving, by a computer system comprising hardware circuitry, a first communication object via a computer network from a first server, the first communication object comprising (i) first data measures mapped to a first multi-dimensional data model configured for access by online analytical processing (OLAP) applications, (ii) parameters indicative of coordinates of a plurality of data dimensions of the first multi-dimensional data model that uniquely identify the first data measures within the first multi-dimensional data model, and (iii) first instructions for automatically exchanging with other objects data including the first data measures; retrieving, by the computer system, a second data measure from an electronic data storage in communication with the computer system according to coordinates of a plurality of data dimensions of a second multi-dimensional data model that uniquely identify the second data measure within the second multi-dimensional data model, the second multi-dimensional data model configured for access by the OLAP applications; determining, by the computer system, an output data measure using the second data measure and at least one of the first data measures; generating, by the computer system, a second communication object comprising (i) the output data measure, (ii) a parameter indicative of coordinates of a plurality of data dimensions of a second multi-dimensional data model that uniquely identify the output data measure within the second multi-dimensional data model, and (iii) second instructions for automatically exchanging with the other objects data including the output data measure; and transmitting, by the computer system, the second communication object via the computer network to a second server, wherein receipt of the second communication object by the second server causes the second server to determine another output data measure using the output data measure and a third data measure retrieved from another electronic data storage in communication with the second server, the third data measure retrieved according to coordinates of a plurality of data dimensions of a third multi-dimensional data model that uniquely identify the third data measure within the third multi-dimensional data model, the third multi-dimensional data model configured for access by the OLAP applications.

The computer-implemented method of the following paragraph can include one or more of the following features: The method can further include integrating, by the computer system, the first communication object with another object used by the computer system to process the second data measure. The integrating can include automatically correlating, by the computer system, data mapping of the first data measures with data mappings of the another object. The automatically correlating can be performed by the computer system based at least on the first instructions. The integrating is performed by the computer system so that a value of at least one of the first data measures automatically initiates a process by the another object. The method can further include requesting, by the computer system, updated values for the first data measures from the first server. The method can further include receiving, by the computer system, updated values for at least some of the first data measures as a data push from the first server. The method can further include transmitting, by the computer system, an updated value for the output data measure to the second server in response to a request from the second server for the updated value for the output data measure. The method can further include transmitting, by the computer system, an updated value for the output data measure as a data push to the second server. The transmitting can include simultaneously or consecutively transmitting, by the computer system, the second communication object to a plurality of servers including the second server, wherein receipt of the second communication object by each of the plurality of servers can cause each server or some servers to determine another output data measure using the output data measure. The method can further include: generating, by the computer system, a user interface comprising a value of the output data measure; and outputting, by the computer system, the user interface to a display of a terminal for presentation on a screen of the display to a viewer. The user interface can include an indication that the computer system received the output data measure from the first server, and the indication can be positioned in juxtaposition to the value of the output data measure. The method can further include generating and outputting a social space for the viewer, and the user interface can be part of the social space. The second multi-dimensional data model can include at least three dimensions, and the output data measure and the second data measure can be stored in the electronic data storage in a relational database structure. The first communication object and the second communication object each can include a data structure and processing routines.

The computer-implemented method of any of the preceding two paragraphs can be performed by a system comprising the computer system including hardware circuitry and the electronic data storage. The computer-implemented method of any of the preceding two paragraphs can also be encoded as instructions on a non-transitory computer-readable medium, such that when the computer system including hardware circuitry executes the instructions, the computer system can perform the method.

BRIEF DESCRIPTION OF THE DRAWINGS

The foregoing and other features, aspects, and advantages of the present disclosure are described in detail below with reference to the drawings of various embodiments, which are intended to illustrate and not to limit the disclosure. The drawings comprise the following figures in which.

DETAILED DESCRIPTION

Introduction

Figure 1:
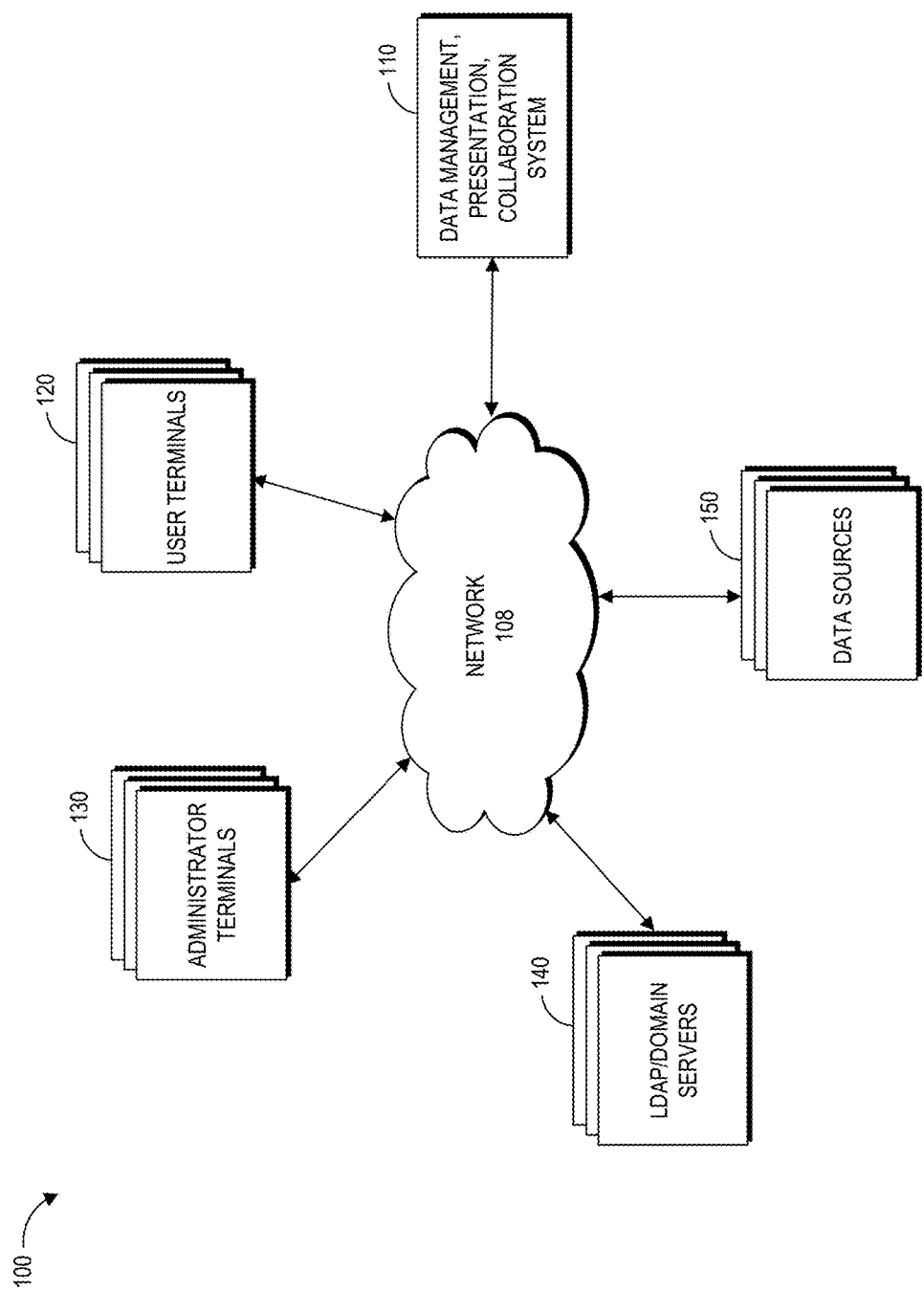
FIG. 1 depicts an embodiment of a computer environment that facilitates collaboration between multiple users or entities.

Although several embodiments, examples, and illustrations are disclosed below, it will be understood by those of ordinary skill in the art that the invention described herein extends beyond the specifically disclosed embodiments, examples, and illustrations and includes other uses of the invention and obvious modifications and equivalents thereof. Embodiments of the invention are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention. In addition, embodiments of the invention can comprise several novel features and no single feature is solely responsible for its desirable attributes or is essential to practicing the inventions herein described.

There are many kinds of collaboration software, and each type of collaboration software generally addresses a particular collaboration task. For example, there are collaboration software packages that support project management functions, such as assigning tasks, managing time deadlines, and/or calendar sharing. Other collaboration software packages allow users to share documents/data, and/or to search for related documents/data.

The use of collaboration software in the workplace can be advantageous in creating a more collaborative work environment wherein employees can better share data and interact with each other in order to achieve a common goal more efficiently and/or more quickly. However, some collaboration software packages only address particular collaboration functions. Accordingly, there is a need for a collaboration software system that combines several collaboration functions into a single software package.

In general, collaboration software, which is enabled and made possible due to the development of networked systems, can be quite advantageous in a work environment. In particular, collaboration software can enable employees and other users to exchange data and share documents and provide relevant insight through networking equipment interfaces. However, in many circumstances, a company or other organization must employ a plurality of collaboration software tools in order to facilitate collaboration between various users. The utilization of a number of disparate collaboration tools can create inefficiencies in the collaboration process. Accordingly, it can be advantageous to have a single collaboration software package that combines the functionality of various other separate collaboration tools. The disclosure herein provides systems, devices, and methods for providing such a collaboration software package that combines the functionality of various collaboration tools.

For example, the embodiments disclosed herein can combine into a single collaboration system enterprise resource planning software tools, collaboration tools, and analytical tools. Specifically, the system can comprise enterprise resource planning tools that are configured to allow an organization to track business resources such as cash, materials, production capacity, or the like, and correlate such information to business commitments, such as orders, purchase orders, shipments, payroll, or the like. This system can be configured to share such data across various departments, such as sales, accounting, manufacturing, or the like, by providing collaboration and sharing tools to facilitate the sharing of such data across departments. The system can also comprise analytical tools for analyzing the data from the enterprise resource planning in order to generate predictions and/or recommendations for users to consider for implementation.

In general, the combining of various collaboration tools into a single collaboration tool package can be advantageous; however, the combination of such collaboration tools can present certain challenges. In particular, there is a need for a unification mechanism that enables various disparate data sets to be unified in a single system. Further, the combination of collaboration tools in itself can only increase the efficiency for collaboration up to a point. Accordingly, there is a need for enabling users to collaborate using different collaboration tool sets in order to further increase the efficiency of collaboration between users. The disclosure herein provides systems, devices, and methods for implementing a unification mechanism that enables the unification of various data sets in such a way that allows for the creation of new collaboration tools that permit greater collaboration between various users.

In an embodiment, the system can be configured to store data, also known as data measures, in for example a relational database. One of ordinary skill in the art will appreciate that other database systems can also be employed with the systems disclosed herein. In an embodiment, the system can be configured to associate with each data measure a unique set of data dimension labels, also known as metadata elements or data dimension coordinates. The combination of data measures with unique data dimension elements/coordinates can form part of objects (for example, in some embodiments, a data structure together with processing routines), also known as bricks, that the system can utilize to combine with other objects. An object can, for example, receive as an input one or more of a calling system application version, filter, attributes, metrics, pop-up opening, task required, and environmental variable. In one example, after performing an algorithm or processing, an object can provide as an output one or more of an after transaction value, automatic updating of other objects, insert/update/delete functions, do commands, acknowledgements such as OK or KO, show-value-on-cell, or pop-up a messaging showing a result. Moreover, an object can have as an attribute one or more of a data/time validity check, object version, system application version, object description, tooltip, authorization, allowed objects, cache authorization, and contextual inputs, and the like.

The combination of objects with other objects can be completed in such a way as to create hyperapps. Objects are combinable with other objects because objects are configured to provide access to the data within the object to other objects. For example, the system can be configured to combine a first data measure showing product sales by salesperson with a second data measure showing product sales in a particular sales region by salesperson. The combination of the first data measure and the second data measure can create a reporting table, and such a reporting table can be known as a hyperapp. Other types of hyperapps are possible, and include but are not limited to data reports where one may add or combine different functional dimensions or objects.

Moreover, the system can provide end users the capability to assemble objects in some embodiments. The end users can, in turn, save the assembled objects (for example, in an end user assembled object inventory) for subsequent use or retrieval. When more than two objects can be assembled, the system can provide the end user the ability to define how the objects interact. In one example, an end user can assemble a rule object, a task object, and a transaction object and define how the objects interact. The end user can provide, for instance, that the rule object is processed first. The end user can then provide that if an output of the rule object is one output, then the task object is processed and the transaction object is not processed. In addition, if the output of the rule object is not the one output, then the transaction object is processed and the task object is not processed. In some embodiments, the end user can be a user of the system other than a provider or administrator of the system.

The system can be configured to combine multiple hyperapps. For example, the system can be configured to display a first hyperapp that displays a report table application in combination with a second hyperapp that displays a pie chart report. The combination of hyperapps is known as a mash or mashboard.

In an embodiment, the system can be configured to enable users to customize and/or combine various hyperapps in a particular way or format that is most suitable for the user. The combination of various hyperapps in a single user display view can allow the user to create a social space. In the social space, a user can collaborate with other users by, for instance, reviewing or analyzing data important to one or more organizations and communicating with other users about the data to facilitate a successful understanding, planning, or executing of organizational objectives. The social space may enable efficient collaboration among users by displaying data in juxtaposition to and/or in the context of one or more user communications.

Furthermore, a social space can display data to a user is most relevant to the job functions of the user. The ability for a user to control and customize the layout of a user's social space enables data to be presented such that the user can be more productive and can better collaborate with others. In an embodiment, the system can be configured to allow for different social spaces for each employee within an organization. By allowing employees to design and create and position data measures within a user's particular social space, the user can collaborate more effectively with other employees because the data is displayed in a unique manner that is best suitable for the employee in order to allow the employee to do a more effective job. In an embodiment, the system is configured to allow a first user to view the social space of a second user in order to allow the first user to view and analyze the data from the perspective of the second user. By allowing the first user to view the data from second user's perspective and job function responsibilities, the first user can obtain greater insight into the data and can more easily collaborate with the second user.

In an embodiment, multiple systems can communicate with one another via a computer network using communication objects, thereby advantageously reducing disconnection inefficiencies in network communication between the multiple systems. The generation, transmission, and processing of such communication objects can enable an ecosystem of networked systems to dynamically be created, supported, and evolve so as to facilitate improved collaboration between organizations utilizing the networked systems. Moreover, the communication objects can desirably enable the communication of data between systems with a limited number of user inputs relative to other approaches for communicating data between systems.

Collaboration System Overview

FIG. 1 depicts a computer environment 100 that facilitates management of disparate data sets for an organization and interactions between multiple users or entities of the organization or a plurality of organizations. The computer environment 100 includes a data management, presentation, and collaboration system 110 (hereafter, system 110) configured to function as a data hub and application platform for an organization, such as a business. The system 110 can manage the collective intelligence of the organization. In addition, the computer environment 100 includes the user terminals 120, administrator terminals 130, LDAP/domain servers 140, and data sources 150 that can be configured to access or provide information to the system 110. The various components of the computer environment 100 can communicate with one another via the network 108. Although the system 110 may be described in one or more of the following examples as functioning in the context of a single organization, the system 110 can, in some embodiments, be used to communicate data between multiple organizations, such as between a business, the business' suppliers, and the business' clients.

The system 110 can function as a data manager for data of the organization. The system 110 can collect and store information, such as structured data (for example, data having a pre-defined data model or organized in a pre-defined manner) and unstructured data (for example, data not having a pre-defined data model or not organized in a pre-defined manner, such as word processing documents, email messages, pictures, or the like), from a variety of sources. The user terminals 120 and administrator terminals 130, for instance, can input and edit information saved by the system 110. The data sources 150 can gather and provide information related to the internal operations of the organization, as well as other information derived from outside the organization that can provide context or details relevant to internally gathered information. In some embodiments, the system can be a server, for example.

The system 110 can also function as a platform for individuals of the organization to flexibly work with the data and interact with other individuals of the organization. For example, the system 110 can analyze data to develop information usable for providing intelligence about the organization. The users of the user terminals 120 can view the intelligence provided by the system 110 via the user terminals 120 to assist with planning of strategy and operations of the organization. The administrators or users can customize and adjust the presentation of information to fit the roles of various users in the organization.

The system 110 can provide data and display information to the user terminals 120 via the network 108. The user terminals 120 can, in turn, process the received data and display the information by one or more user interfaces to users of the user terminals 120. The users can examine the information from the system 110 displayed by the terminals 120 to access integrated data about the organization. For example, the users can review the information to make more informed decisions based on past business decisions. The users can analyze the information to determine a course of action or understand links between various data and decisions by the organization.

The user terminals 120, in addition, can enable the users to control the information provided by the system 110 and to interact with other user terminals 120. A user of a particular user terminal, for example, may request that the system 110 transmit certain data to populate a report relevant to the user. In response to the request, the system 110 can retrieve the requested data and display information (for example, metadata) relevant to the report. The system 110 can transmit the data and display information to the requesting user terminal so that the requested report may be displayed on the user terminal. The user can interact with the displayed report, for instance, by adjusting what data is displayed and how data is displayed (for example, by controlling the consolidation, drill-down, and/or slicing or dicing of the data). Moreover, the user can input information via interaction with the report that can be provided to the system 110 and subsequently shared by the system 110 with one or more users of other user terminals 120. Through this shared communication between the user terminals 120, users can collaborate based on data managed by the system 110, enhance the collective intelligence of the organization, and increase the ease with which information can be passed in the organization. Advantageously, in some embodiments, this approach can enable the users of the user terminals 120 to communicate through the system 110 without resorting to communication via other mediums, such as by email or chat services separate from the system 110 that can manage data for the organization.

The administrator terminals 130 can be used by administrators, such as IT professionals, to control development and administration of the system 110. The administrators, for example, may rely on the administrator terminals 130 to map a database structure of the system 110, create metrics or filters, generate reports, manage data and system security, create and manage users, manage performance, define the organizational hierarchy, develop applications and components of applications, construct mashboards, or the like.

The data sources 150 can represent numerous different data sources that may communicate with components of the computer environment 100, such as the system 110. The data sources 150 can, for example, include one or more of: a document search server, semantic engine, enterprise data warehouse, data mart, flat file, Excel file, XML file, filer or file system, operational database management system, web server, enterprise resource planning system, customer relationship management system, social networking websites, or the like. The data sources 150 can supply the system 110 with at least some of the data stored and managed by the system 110.

The network 108 of the computer environment 100 can include one or more of a LAN (Local Area Network), WAN (Wide Area Network), or the Internet, for instance. The components of the computer environment 100, for example, can be connected to the network 108 via a wired, wireless, or combination of wired and wireless, communication link. The network 108 can connect the various computing devices and/or other electronic devices via wired or wireless communication links. In some embodiments, some or all components of the computer environment 100 can communicate through a private or internal organizational network of the network 108. The LDAP/domain servers 140 can provide directory features and/or domain name mapping for at least the network 108.

Figure 2:
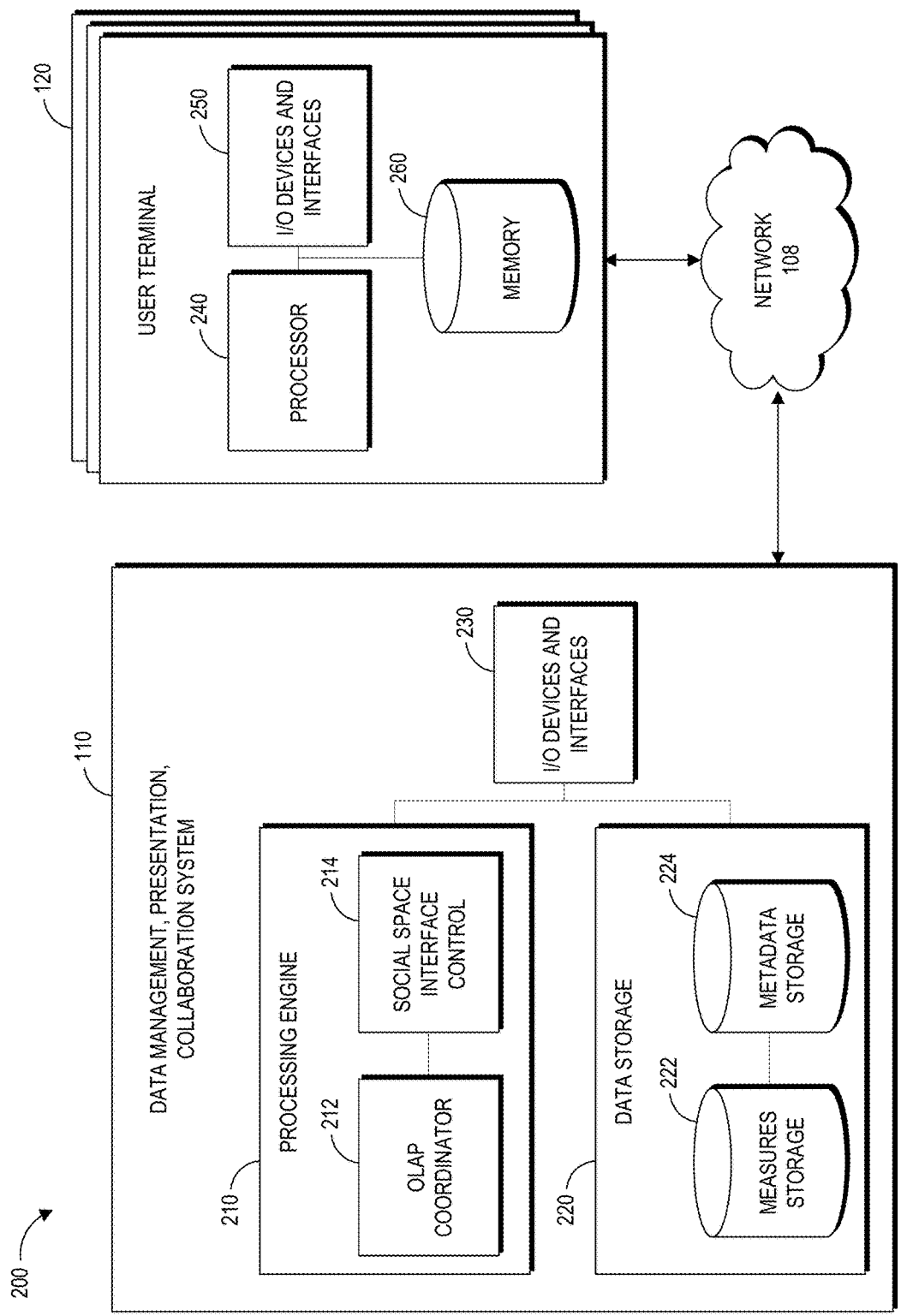
FIG. 2 depicts an embodiment of components of the computer environment of FIG. 1.

FIG. 2 depicts an embodiment 200 of components of the computer environment 100 of FIG. 1, including the system 110 and the user terminals 120. As illustrated in FIG. 2, the system 110 can include a processing engine 210, data storage 220, and input/output (I/O) devices and interfaces 230. The user terminals 120 can each include a processor 240, I/O devices and interfaces 250, and memory 260. The processing engine 210 and the processor 240 each can, for example, include one or more hardware processors or digital logic circuits.

The data storage 220 can include measures storage 222 and metadata storage 224. The data stored in the measures storage 222 and the metadata storage 224 can at least in part be mapped to one or more multi-dimensional data structures, such as one or more online analytical processing (OLAP) cubes. The individual multi-dimensional data structures can have at least three dimensions in some implementations. An OLAP cube can include numeric values or facts (for example, values indicative of performance of an organization that can vary over time based in part on measured values), which can be referred to as data measures. The data measures, in turn, can be categorized by data dimensions and understood as located at the intersections of the OLAP cube, which is spanned by the data dimensions. Each measure can be considered as having a set of data dimension coordinates or labels (sometimes referred to as metadata) of a multidimensional data structure that may be associated with the data measure that can uniquely identify the data measure within the multidimensional data structure.

In one implementation, the data dimension coordinates can include a name or identifier of a data measure, in addition to particular identified dimensions of the multidimensional data structure. In some embodiments, the measures storage 222 can include one or more relational databases configured to store data measures for the organization and data dimensions corresponding to the data measures, and the metadata storage 224 can include one or more relational databases configured to store the contextual objects associated with the data measures. Additionally or alternatively, the measures storage 222 or metadata storage 224 can include one or more other types of databases or approaches for data file management, such as Microsoft Excel, comma separated values (CSV), web services, XML, or Apache Hadoop. Moreover, although the measures storage 222 and metadata storage 224 are illustrated as separate storages in FIG. 2, the measures storage 222 and metadata storage 224 can be combined into a single storage in some implementations.

In some implementations, the data dimension coordinates associated with a data measure can be processed or stored by the system in the form of a parameter (for example, a cell identifier or other unique identifier) that uniquely maps to particular data dimension coordinates, alternatively or in addition to directly processing or storing the particular data dimension coordinates. The parameter, for instance, can be determined or understood as a function of data dimension coordinates such that the data dimension coordinates associated with a data measure can be converted one-to-one from a data dimension coordinates space to a parameter space. Furthermore, in an embodiment, the parameter can be or include the data dimension coordinates associated with a data measure or data object.

The processing engine 210 can include an OLAP coordinator 212. The OLAP coordinator 212 can, for example, utilize data dimension coordinates or a parameter indicative thereof associated with a particular data measure to lookup in the metadata storage 224 whether one or more contextual objects may be associated with the particular data measure. In addition, the OLAP coordinator 212 can provide the results of the lookup to the user terminals 120 so that one or more indications of the one or more contextual objects associated with the particular data measure may be displayed alongside the particular data measure by the user terminals 120.

The processing engine 210 can include a social space interface control 214. The social space interface control 214 can provide instructions and programming code for the user terminals 120 to enable the user terminals 120 to the display the user interfaces for interacting with the system 110. In some embodiments, the user interfaces can be constructed and operated using a web browser of the user terminals 120, for instance, via JavaScript, HTML, and XML programming code. At least a portion of this programming code can be provided by the social space interface control 214. However, in other embodiments, a dedicated application run by the operating system of the user terminals 120 can instead communicate with the social space interface control 214 to provide the user interfaces of the user terminals 120. The communication between the system 110 and the user terminals 120 can be performed through the I/O devices and interfaces 230 and I/O devices and interfaces 250, which can be configured to communicate over the network 108. The I/O devices and interfaces 230 and I/O devices and interfaces 250 can each include one or more of a transceiver, transmitter, or receiver for communicating instructions or data via the network.

The processor 240 and memory 260 of the user terminals 120 can present one or more user interfaces on a display device, such as a monitor, of the I/O devices and interfaces 250. The user interfaces can facilitate the display of data provided by the system 110 to users of the user terminals 120 and allow users to access data through the use of stylized screen elements such as, for example, menus, windows, dialog boxes, toolbars, and controls (for example, radio buttons, check boxes, sliding scales, or the like). Additionally, the I/O devices and interfaces 250 can include input or output devices such as a keyboard, mouse, touchpad, or touchscreen through which users can provide indications or commands to the user terminals 120.

Figure 3:
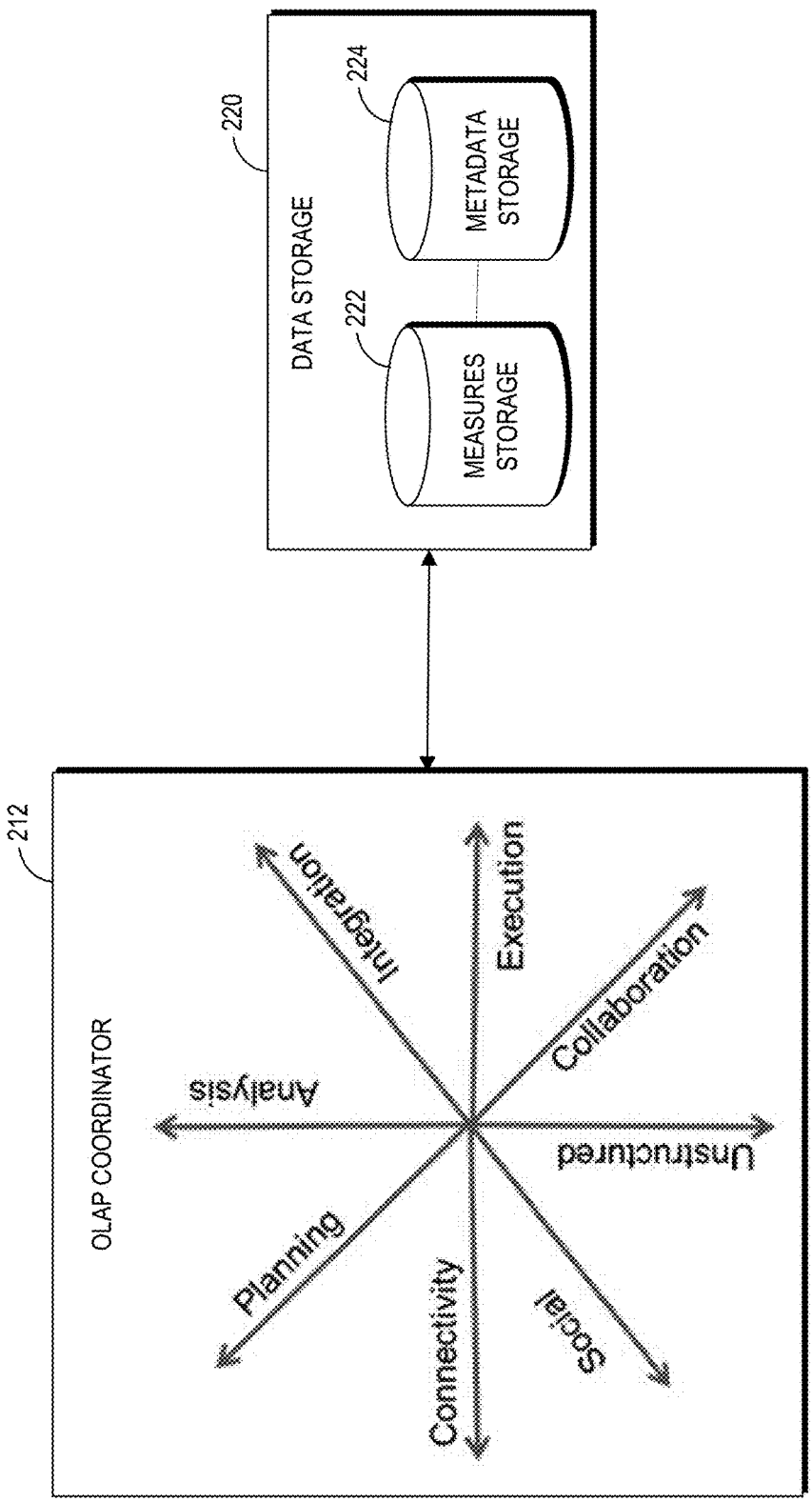
FIG. 3 depicts an embodiment of an online analytical processing (OLAP) coordinator useable to receive data from a data storage.

FIG. 3 depicts an embodiment of the OLAP coordinator 212 useable to receive data from one or more data storages. As illustrated by the star structure within the OLAP coordinator 212, the OLAP coordinator 212 can be configured to receive and utilize data of numerous disparate types. Each arrow or vector of the star structure can represent a hyperspace or a different type of data or function that may be handled by the OLAP coordinator 212. The OLAP coordinator 212, for instance, can handle analysis data (for example, analytical, presentation, or data navigation features), integration data (for example, workflow enhancement or new application developing methods), execution data (for example, application development), collaboration data (for example, discussions, tasks, activity flows, or signals), unstructured data (for example, semantic searches or document editors), social data (for example, social environment or social spaces), connectivity data (for example, client or supplier communications), and planning data (for example, processes or workflows).

Figure 4:
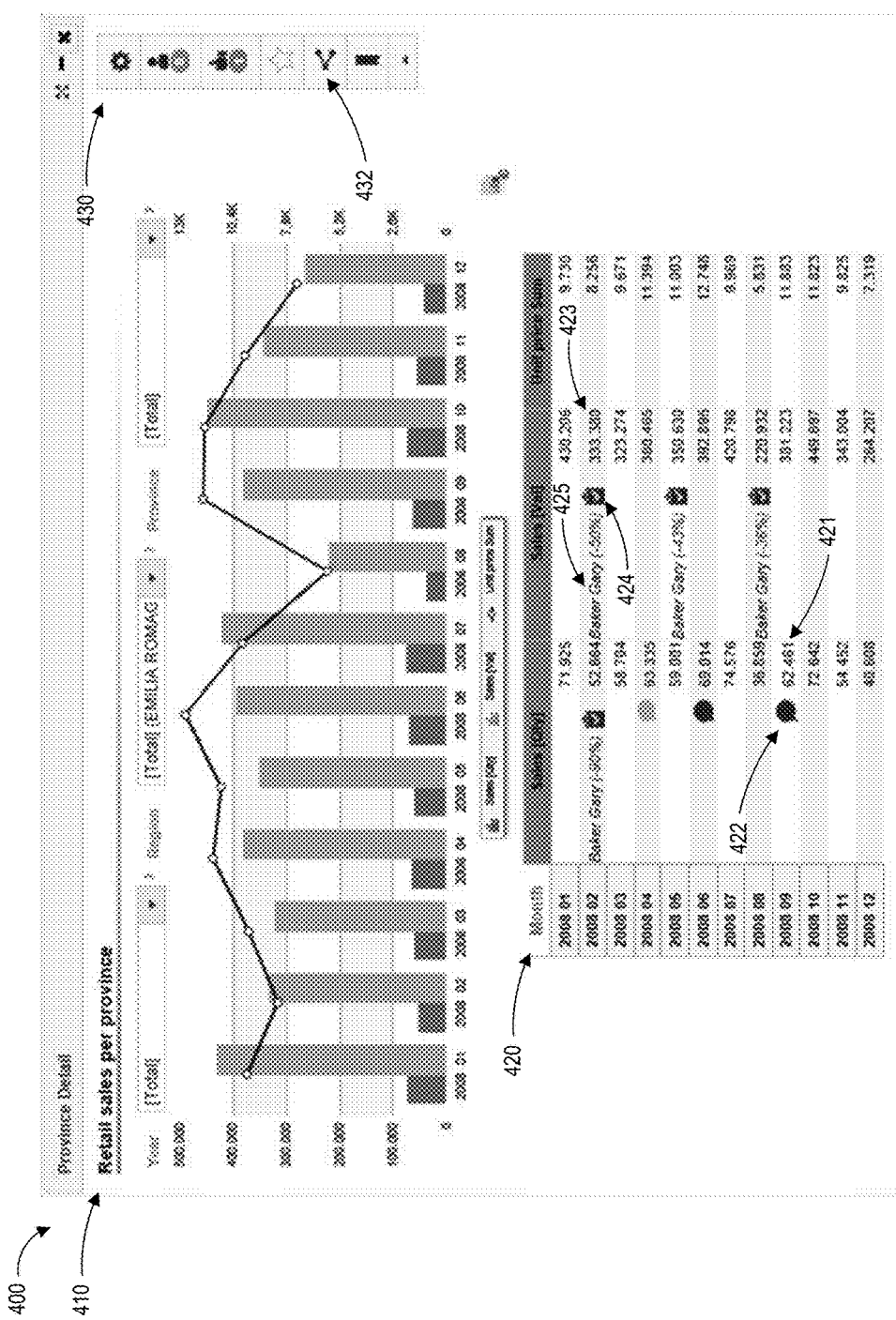
FIG. 4 depicts an example user interface for facilitating collaboration between users or entities.

FIG. 4 depicts an example user interface 400 that facilitates collaboration between users based on data measures. The user interface 400 can, for example, be presented on one or more displays of the I/O devices and interfaces 250 of the user terminals 120. The user interface 400 can show multiple data measures to the users of the user terminals 120, along with one or more contextual objects associated with the presented data measures. The information displayed can be provided to the user terminals 120 by the system 110. In the example of FIG. 4, information about the retail sales per province is displayed in the user interface 400.

The user interface 400 includes a chart 410, a report 420, and user navigation and task buttons 430. The chart 410 can display multiple data measures in a visually appealing form, such as a graph, for review by the users. As is illustrated in FIG. 4, the chart 410 can display data in the form of bars in a bar graph or connected points in a line graph. The report 420 can display the multiple data measures through a pivot table in a grid or spreadsheet for review by the users. The x-axis and y-axis of the report 420 can display the different dimensions corresponding to the data measures, providing descriptions for the data measures displayed in the report 420. The user navigation and task buttons 430 can provide various navigation or operation functionalities when selected by the users. One button of the user navigation and task buttons 430 includes the signal button 432 that, when selected, can enable a user to assign a signal object to a chart or report.

Among the data measures displayed in the report 420 is the data measure 421. The data measure 421, in particular, provides the quantity of retail sales for the month of September in the year 2008 for an organization. The value of the data measure 421 is 62,461 sales at the depicted time. In association with the data measure 421 is displayed an indication 422 of a discussion object (for example, the data measure 421 can be alongside or near the associated data measure such that users can understand that the indication 422 is associated with the data measure 421). When the indication 422 may be selected (for example, based on a user clicking/pressing the indication 422 or placing a pointer over the indication 422), the contents of the discussion object corresponding to the indication 422 can be displayed.

In addition, the data measures of the report 420 include the data measure 423. The data measure 423 shows the value of retail sales for the month of February in the year 2008 for the organization. The value of the data measure 423 is 333,380 value at this time. In association with the data measure 423 is displayed an indication 424 of a task object (for example, the data measure 423 can be alongside or near the associated data measure such that users can understand that the indication 424 is associated with the data measure 423). When the indication 424 may be selected by user (for example, based on a user clicking/pressing the indication 422 or placing a pointer over the indication 422), the contents of the task object corresponding to the indication 424 can be displayed.

Collaboration Between Systems

Figure 5:
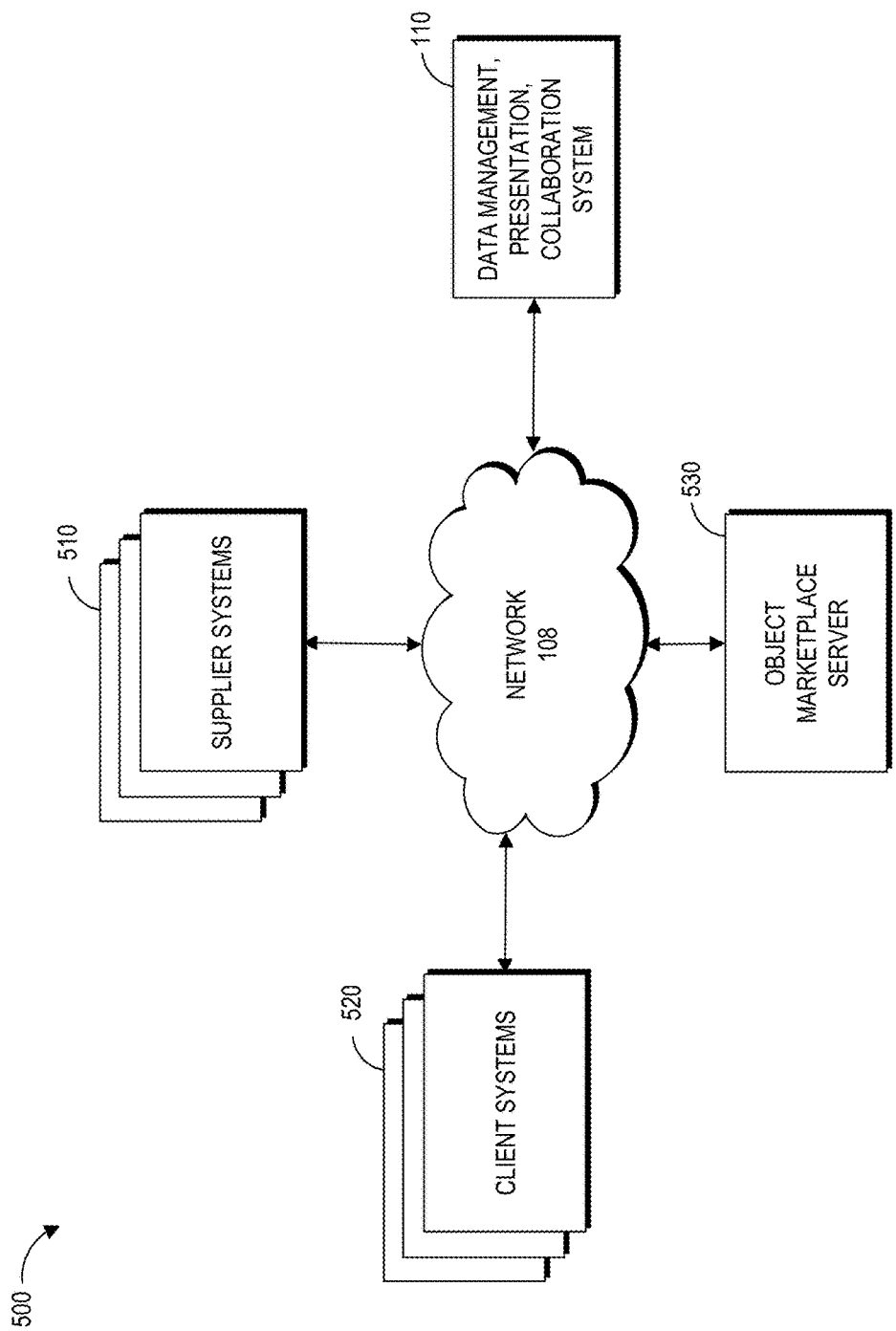
FIG. 5 depicts a computer environment that facilitates exchange and processing of data measures and objects across multiple systems of multiple organizations.

FIG. 5 depicts a computer environment 500 that facilitates exchange and processing of data measures and objects across multiple systems of multiple organizations. The computer environment 500 includes the system 110, supplier systems 510, client systems 520, and an object marketplace server 530. The supplier systems 510 can each be a different supplier for the organization operating the system 110, and the client systems 520 can each be a different client for the organization operating the system 110. The supplier systems 510 and client systems 520 can each be configured similarly to or, in some ways, the same as the system 110. The supplier systems 510 and client systems 520 can each, for example, function as a data hub and application platform for an organization, such as a business, and can manage the collective intelligence of the organization. Moreover, the supplier systems 510 and client systems 520 can each communicate with one or more unillustrated associated user terminals, administrator terminals, LDAP/domain servers, and data sources as described with respect to FIG. 1, for instance. The object marketplace server 530 can serve as a depository or virtual storefront for providing and obtaining objects usable by the system 110, supplier systems 510, or client systems 520 for managing or processing data. The various components of the computer environment 100 can communicate with one another via the network 108, such as a public or inter-organization network of the network 108. In some embodiments, communication via the network 108 can happen on encrypted channels, and a data integrity check (for example, a cyclical redundancy check) can be performed on received communications to ensure accurate transmission via the network 108.

The system 110, supplier systems 510, and client systems 520 can share data, such as data measures, with one another via the network 108. One of the client systems 520 can, for example, transmit data to the system 110 about demand or other information relevant to the organization that operates the system 110 so that the organization operating the system 110 can store or process the data to understand the needs or expectations for the organization operating the client system. The system 110 can in turn, for instance, transmit data to one of the supplier systems 510 about demand or other information relevant to the organization operating the supplier system so that the organization operating the supplier system can store or process the data to understand the needs or expectations for the organization operating the system 110.

The system 110, supplier systems 510, and client systems 520 can further share objects with one another via the network 108. The shared objects can be modular and integrated with one or more other objects of a system so as to provide additional functionality sharable with the one or more other objects of the system. The shared objects can, for example, be used to process data using an algorithm and output a result of the processing to the one or more other objects for further processing. In some embodiments, the objects can be shared between the system 110, supplier systems 510, and client systems 520 using authorized connections but not using unauthorized connections, so as to provide security protections for the transfer of data. The transfer of objects can be performed, for example, via Hypertext Transfer Protocol in some implementations. In some embodiments, hyperapps and social spaces can further be shared between the system 110, supplier systems 510, and client systems 520.

The system 110, supplier systems 510, and client systems 520 can further share communication objects with one another via the network 108. The communication objects can be a particular type of object that includes both data (for example, data measures) and metadata (for example, data dimension coordinates or data model information associated with data measures) organized in a data structure. The communication objects can, for instance, be used by any of the system 110, supplier systems 510, and client systems 520 to control the selection and transmission of data from the system to another system, as well as to interpret received data from another system. The communication objects can each also include multiple objects, such as a combination of objects, so that one communication object can be considered a hyperapp, in some embodiments.

In one implementation, a communication object can include instructions, such as Extensible Markup Language (XML) code, used to describe the data and metadata such that the data structure for the data and metadata may not need to be pre-built by a system and can be dynamically understood from the instructions. The system 110, supplier systems 510, and client systems 520 can each, moreover, generate the communication objects to facilitate push or pull communication of information between the systems in the computer environment 500. The push or pull communication can, for instance, be peer-to-peer communication between the systems. In some embodiments, communication in each direction from one system to another can be performed via a different communication channel.

The communication objects can, in certain embodiments, advantageously enable data to be bound up in a consistent way (for example, using the same or similar data structure, organization, or metadata) so that the communication objects can be modular and reusable objects for different systems. The communication objects can obviate custom coding at the system 110, supplier systems 510, or client systems 520 to enable communication of data and metadata between the systems. The communication objects can additionally facilitate self-discovery of a data model and automatic mapping of correlations from one communication object to other objects upon receipt of the communication objects by one of the systems. Such self-discovery and automatic mapping of correlations can permit rapid integration of the communication object with other objects, for example, so that an event triggered by the communication object can be quickly and easily communicated to the other objects for processing. As a result, in some embodiments, an integration time for a communication object with the other objects in a system may take a few minutes, in contrast to an integration time of a few hours or days for a system that may integrate data and metadata with objects using some other approaches.

The object marketplace server 530 can serve as a repository or virtual storefront for the system 110, supplier systems 510, and client systems 520 to exchange, test, purchase, license, transfer, or sell objects usable by the system 110, supplier systems 510, or client systems 520 for managing, processing, or displaying data. In one example, a particular object developed for and used by the one of the client systems 520 can incorporate an algorithm for processing or managing data. The organization operating that client system can provide the particular object for download via the object marketplace server 530 and thus for use by one or more other systems in the computer environment 500, such as the supplier systems 510. One of the supplier systems 510 can, for instance, then download the particular object from the object marketplace server 530 and utilize the particular object in the supplier system without the organization operating the supplier system having to separately develop the particular object including the algorithm for processing or managing data. In certain embodiments, the organization operating the client system that provided the particular object can advantageously be compensated by the organization operating the supplier system for sharing the particular object. In turn, the organization operating the supplier system that utilizes the particular object can conserve resources by not independently developing the particular object. In some embodiments, the objects obtained from the object marketplace server 530 can be customized or configured after being obtained so that the objects can function or integrate differently for different systems.

Although the computer environment 500 can enable communication between components of different organizations as explained with respect to some examples, in some embodiments, two or more systems of the system 110, supplier systems 510, and client systems 520 can be within the same organization and thus facilitate intra-organization communication in addition or alternatively to inter-organization communication.

Figure 6:
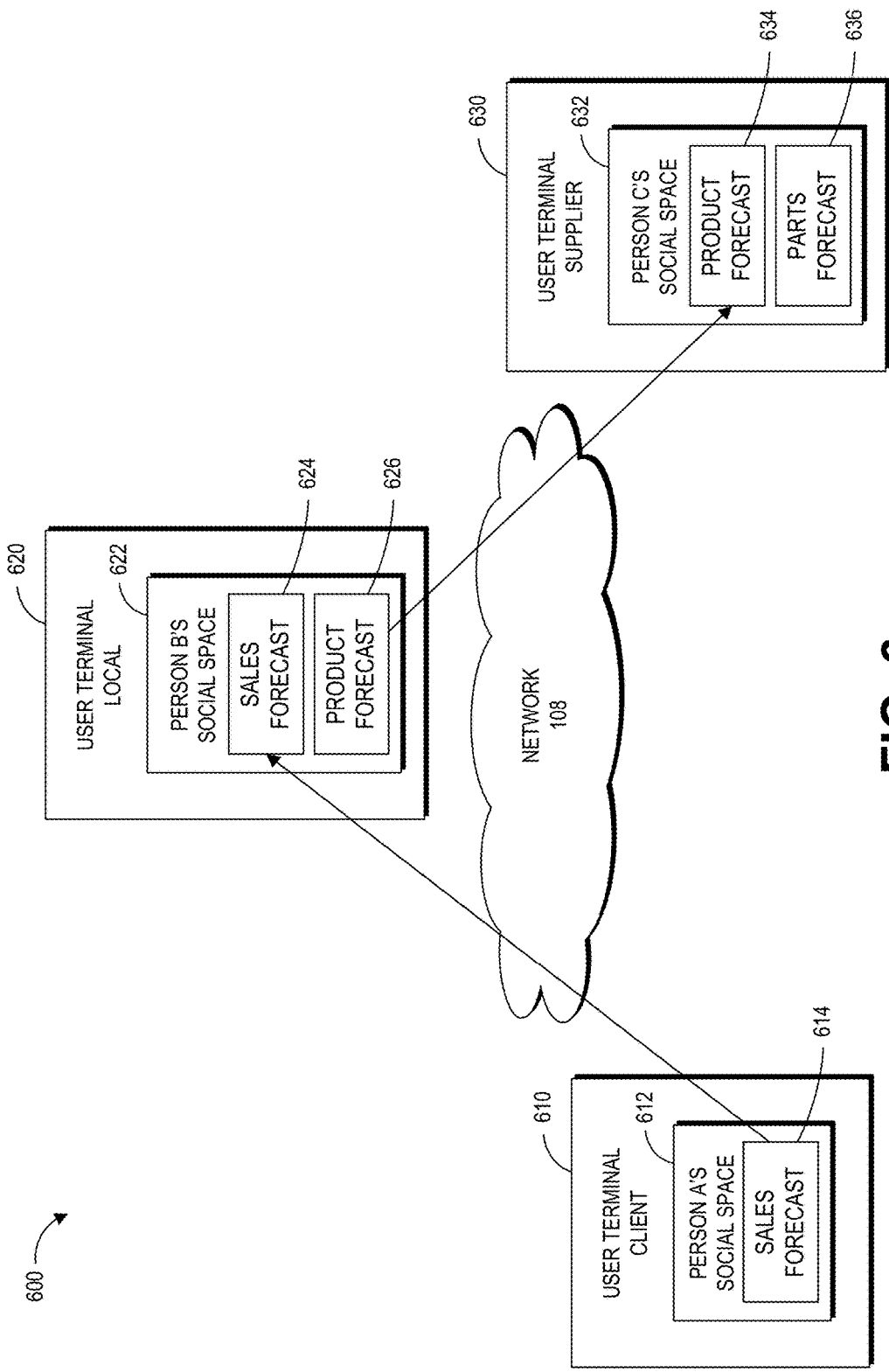
FIG. 6 depicts example communication in a computer environment having user terminals configured to communicate via a network.

FIG. 6 depicts example communication in a computer environment 600 having three user terminals configured to communicate via a network. The computer environment 600 can include components of the computer environment 100, such as the user terminals 120, which can be in communication with unillustrated components of the computer environment 500, such as one of the system 110, supplier systems 510, and client systems 520. The user terminal client 610 can be a user terminal in communication with one of the client systems 520, the user terminal local 620 can be a user terminal in communication with the system 110, and the user terminal supplier 630 can be a user terminal in communication with one of the supplier systems 510. Accordingly, although the user terminal client 610, user terminal local 620, and user terminal supplier 630 may be illustrated as directly communicating in the computer environment 600, this may be for illustration purposes and to show a flow of data from one user terminal to another. The user terminal client 610, user terminal local 620, and user terminal supplier 630 can, in some embodiments, thus communicate indirectly through one or more of the system 110, supplier systems 510, and client systems 520 to facilitate the flow of data.

The user terminal client 610 can display an individual user's (for example, person A's) social space, such as the social space 612, usable to present data from one of the client systems 620 and communicate data to the client system. The user terminal local 620 can display an individual user's (for example, person B's) social space, such as the social space 622, usable to present data from the system 110 and communicate data to the system 110. The user terminal supplier 630 can display an individual user's (for example, person C's) social space, such as the social space 632, usable to present data from one of the supplier systems 630 and communicate data to the supplier system.

As illustrated, the social space 612 of the user terminal client 610 can display, for instance, a sales forecast 614. The sales forecast 614 can be a user interface for displaying sales forecast data related to sales of one or more items sold by the organization that operates the client system. To facilitate the sharing of this sales forecast data with one or more other systems, a permitted user (for example, an administrator or management user) can generate a communication object including (1) the sales forecast data as data measures, (2) parameters indicative of coordinates of data dimensions of a multi-dimensional data model that uniquely identify the sales forecast data as data measures within the multi-dimensional data model, and (3) instructions for automatically exchanging the sales forecast data with other objects (for instance, the instructions can enable the automatic creation of a data structure and mapping of the data dimensions associated with the sales forecast data as data measures). The permitted user can subsequently publish the communication object as a web service or transmit the communication object as a request so that other systems can access the communication object and thus the sales forecast data.

The system 110 can receive or access the published or transmitted communication object generated by the client system. A permitted user (for example, an administrator or management user) of the system 110 can approve the communication object or dismiss the communication object. If the permitted user approves the communication object, the system 110 can determine whether the data dimensions for the sales forecast data (for example, i. SKU, ii. Warehouse, and iii. QTY-In_stock) map to existing data dimensions (for example, i. Product, ii. WH, and iii. QTY-Warehouse) managed by the system 110. If the data dimensions for the forecast data map to existing data dimensions, the system 110 can automatically map the data dimensions to the existing data dimensions (for example, i. SKY=Product, ii. Warehouse=WH, and iii. QTY-In_Stock=QTY-Warehouse) using the instructions in the communication object. If the data dimensions for the sales forecast data do not map to existing data dimensions, the system 110 can automatically create and store a data structure for the sales forecast data, map the data dimensions to the data structure, and store the sales forecast data mapped to the data dimensions using the instructions in the communication object.

As a result of the system 110 processing the communication object, the user terminal local 620 can access and display the sales forecast data in a sales forecast 624 (for example, a user interface) of the social space 622 as indicated by the arrow linking the sales forecast 614 and sales forecast 624. An indication that the system 110 received the sales forecast data from the client system can be positioned in juxtaposition, nearby, or beside one or more values of the sales forecast data in the sales forecast 624. The system 110 can further request and receive updated values for the data measures of the sales forecast data from the client system as a data pull. Additionally or alternatively, the system 110 can automatically receive updated values for the data measures of the sales forecast data from the client system as a data push. Moreover, access or viewing of the communication object or sales forecast data can be limited to certain users, such as users having an appropriate authentication or security clearance.

The system 110 can use the sales forecast data in combination with one or more other data measures accessible by the system 110 to determine one or more additional data measures. In one example, the system 110 can access data measures indicative of a number of products that are included in a particular item sold by the organization operating the client system and also access data measures indicative of the forecasted number of items to be sold by the organization operating the client system from the sales forecast data. From this information, the system 110 can determine product forecast data (for example, the number of items to be sold multiplied by the number of products included in an item can be the product forecast) for the system 110 and, in some embodiments, store this product forecast data as data measures. The user terminal local 620 can additionally display the product forecast data in a product forecast 626 (for example, a user interface) of the social space 622.

The system 110 can in addition enable the product forecast data to be shared with one or more other systems by generating a communication object. A permitted user (for example, an administrator or management user) can generate the communication object to include (1) the product forecast data as data measures, (2) parameters indicative of coordinates of data dimensions of a multi-dimensional data model that uniquely identify the product forecast data as data measures within the multi-dimensional data model, and (3) instructions for automatically exchanging the product forecast data with other objects (for instance, the instructions can enable the automatic creation of a data structure and mapping of the data dimensions associated with the product forecast data). The permitted user can subsequently publish the communication object as a web service or transmit the communication object as a request so that other systems can access the communication object and thus the product forecast data.

One of the supplier systems 510 can receive or access the published or transmitted communication object generated by the system 110. A permitted user (for example, an administrator or management user) of the supplier system can approve the communication object or dismiss the communication object. If the permitted user approves the communication object, the supplier system can determine whether the data dimensions for the product forecast data map to existing data dimension managed by the supplier system. If the data dimensions for the forecast data map to existing data dimensions, the supplier system can automatically map the data dimensions to the existing data dimensions using the instructions in the communication object. If the data dimensions for the product forecast data do not map to existing data dimensions, the supplier system can automatically create and store a data structure for the product forecast data, map the data dimensions to the data structure, and store the product forecast data mapped to the data dimensions using the instructions in the communication object.

As a result of the supplier system processing the communication object, the user terminal supplier 630 can access and display the product forecast data in a product forecast 634 (for example, a user interface) of the social space 632 as indicated by the arrow linking the product forecast 626 and product forecast 634. An indication (for example, an icon or alert) that the supplier system received the product forecast data from the system 110 can be positioned in juxtaposition, nearby, or beside one or more values of the product forecast data in the product forecast 634. The supplier system can request and receive updated values for the data measures of the product forecast from the system 110 as a data pull. Additionally or alternatively, the supplier system can automatically receive updated values for the data measures of the product forecast data from the system 110 as a data push. Moreover, access or viewing of the communication object or product forecast data can be limited to certain users, such as users having an appropriate authentication or security clearance.

The supplier system can use the product forecast data in combination with one or more other data measures accessible by the supplier system to determine one or more additional data measures. In one example, the system 110 can access data measures indicative of a number of parts that are included in a particular product sold by the organization operating the system 110 and also access data measures indicative of the forecasted number of products to be sold by the organization operating the system 110 from the product forecast data. From this information, the supplier system can determine parts forecast data (for example, the number of products to be sold multiplied by the number of parts included in a product can be the parts forecast) for the system 110 and, in some embodiments, store this parts forecast data as data measures. The user terminal supplier 630 can additionally display the pans forecast data in a parts forecast 636 (for example, a user interface) of the social space 632.

Figure 7:
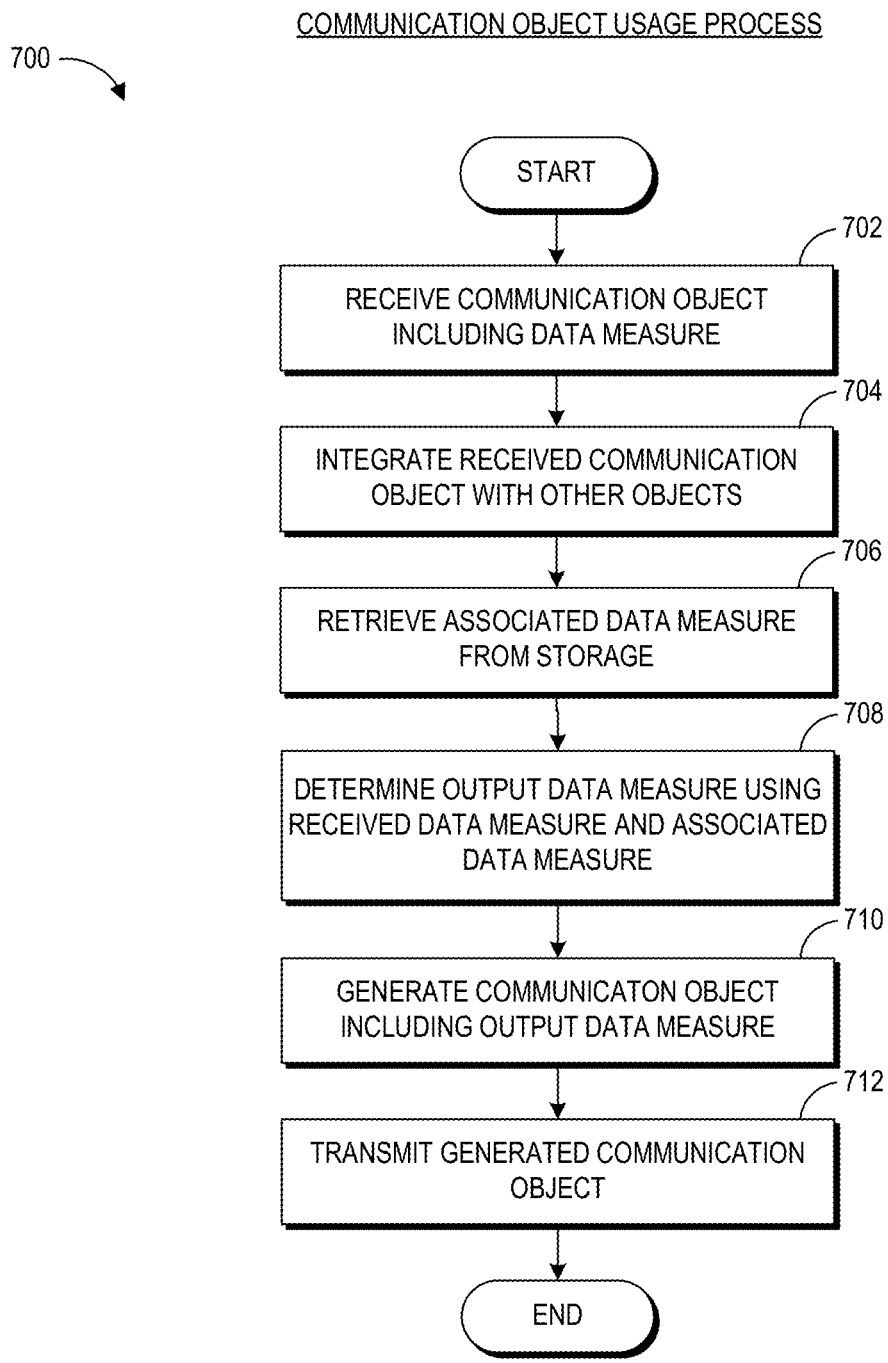
FIG. 7 depicts an embodiment of a communication object usage process.

FIG. 7 depicts an embodiment of a communication object usage process 700. For convenience, the process 700 is described as being implemented by components of the computer environments 100 and 500. However, the process 700 is not limited as such and may be implemented by any other system described herein or components thereof, or other computing devices or systems comprising physical computer hardware and/or software. In some embodiments, the process 700 can be performed by the system 110. Advantageously, in certain embodiments, the process 700 can enable a system, such as the system 110, to dynamically create and support the exchange of data measures with one or more other systems like the supplier systems 510 or client systems 520 with limited end user interaction.

At block 702, the process 700 can receive a communication object. The communication object can, for example, be received via a network, such as the network 108, from another system like one of the client systems 520. The communication object can include data measures mapped to a multi-dimensional data model. The multi-dimensional data model can be accessible by OLAP applications. For instance, the multi-dimensional data model can be accessible by OLAP applications, such as OLAP applications executed by the client system or the system 110 or other properly configured systems within the computer environment 500, but may not be accessible by other OLAP applications. The communication object can further include coordinates or parameters indicative thereof of multiple data dimensions of the multi-dimensional data model that uniquely identify the data measures within the multi-dimensional data model. The communication object can also include instructions for automatically communicating with other objects data including the data measures. The instructions can enable the automatic creation of a data structure and mapping of the data dimensions associated with the data measures. In one example, the communication object can provide sales forecast data from a client system like one of the client systems 520 as described with respect to FIG. 6.

At block 704, the process 700 can integrate the received communication object with one or more other objects. For instance, the system 110 can integrate the data structure and mapping of the data dimensions associated with the data measures from the communication object with a data structure or mapping of the data dimensions associated with other data measures managed or processed by the system 110 or stored in the data storage 220. In particular, the system 110 can, in one implementation, automatically correlate data mappings of the data measures from the communication object with data mapping of another object managed or processed by the system 110 or stored in the data storage 220. The integration or automatic correlation can be performed, for example, at least using the instructions from the communication object. In some embodiments, the integration of the communication object by the system 110 or a value of a data measure from the communication object can further cause the system 110 to automatically initiate a process by another object managed or processed by the system 110.

At block 706, the process 700 can retrieve an associated data measure from a storage. For example, the system 110 can retrieve a data measure from the data storage 220 using coordinates of multiple data dimensions of a multi-dimensional data model that uniquely identify the data measure within the multi-dimensional data model for the data storage 220, and the retrieved data measure can be associated with the data measure from the communication object and thus be an associated data measure. In one example, the associated data measure can provide product content data indicating a number of products per sale by the organization providing the sales forecast data as described with respect to FIG. 6.

At block 708, the process 700 can determine an output data measure using the received data measure from the communication object and the associated data measure. For instance, the system 110 can process the received data measure and the associated data measure according to a function to determine the output data measure. In one example, the system 110 can determine product forecast data based on sales forecast data from the communication object and product content data from the data storage 220 as discussed with respect to FIG. 6. In some embodiments, the system 110 can store the output data measure in the data storage 220, and the output data measure can be mapped to coordinates of multiple data dimensions of the multi-dimensional data model for the data storage 220 that uniquely identify the data measure within the multi-dimensional data model for the data storage 220.

At block 710, the process 700 can generate a communication object including the output data measure. The communication object can include output data measure and potentially one or more other data measures. The communication object can further include the coordinates or parameters indicative thereof of multiple data dimensions of a multi-dimensional data model that uniquely identify the output data measure within the multi-dimensional data model. The communication object can also include instructions for automatically communicating with other objects data including the output data measure. The instructions can enable the automatic creation of a data structure and mapping of the data dimensions associated with the output data measure. In one example, the communication object can provide the product forecast data as described with respect to FIG. 6.

At block 712, the process 700 can transmit the generated communication object. For instance, the system 110 can transmit the generated communication object via the network 108 to one or more different systems (for example, even to tens or hundreds of different systems), such as to one or more of the supplier systems 510. The transmission of the communication object to two or more of the different systems can also be simultaneously or consecutively performed by the system 110 in some implementations. In some embodiments, receipt of the communication object can cause one or more of the receiving systems, such as one or more of the supplier systems 510, to determine another output data measure using the output data measure from the generated communication object. One or more of the receiving systems can, for example, determine another output data measure using the output data measure from the generated communication object and a data measure retrieved from a storage in communication with the one or more of the receiving systems. The data measure retrieved from the storage in communication with the one or more of the receiving systems can be retrieved using coordinates of multiple data dimensions of a multi-dimensional data model that uniquely identify the data measure within the multi-dimensional data model. The multi-dimensional data model can be accessed by OLAP applications. For instance, the multi-dimensional data model can be accessible by OLAP applications, such as OLAP applications executed by the system 110 or the supplier system or other properly configured systems within the computer environment 500, but may not be accessible by other OLAP applications. In one example, one of the receiving systems can determine item forecast data using the product forecast data and one or more data measures indicative of a number of items per product for the organization providing the product forecast data as discussed with respect to FIG. 6.

Figure 8:
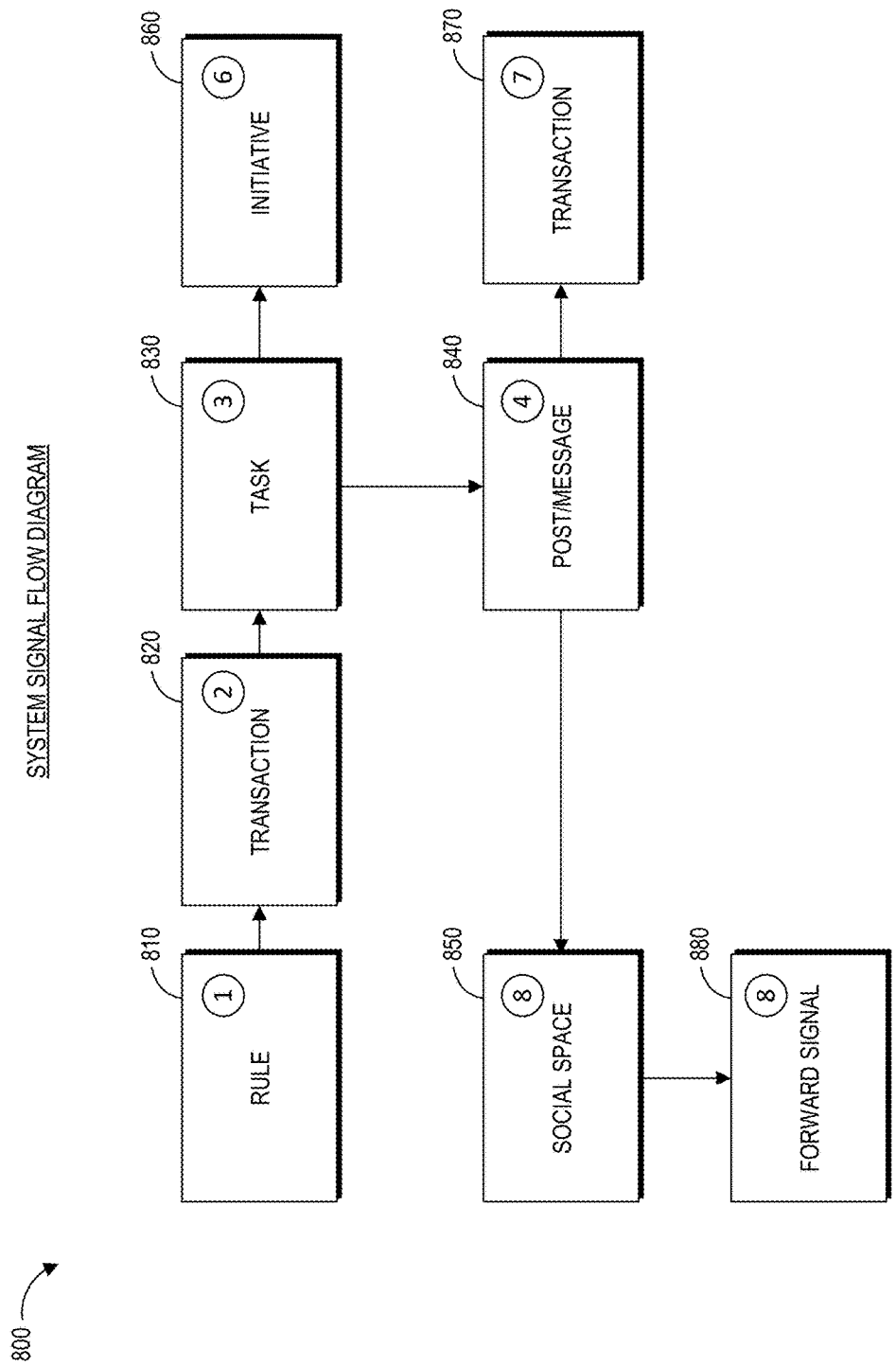
FIG. 8 is a flow chart depicting an example system signal flow diagram in an operational activity chain.

FIG. 8 is a flow chart depicting a system signal flow diagram 800 in an operational activity chain. For convenience, processes associated with the diagram 800 may be described as being implemented by the components of the computer environments 100 and 500. However, the processes associated with the diagram 800 are not limited as such and may be implemented by any other system described herein or components thereof, or other computing devices or systems comprising physical computer hardware and/or software. In some embodiments, the processes associated with the diagram 800 can be performed by the system 110. Advantageously, in certain embodiments, the diagram 800 depicts how a system can support links between multiple coordinated interconnected activities in order to better manage, track, and audit activities processed by the system.

A user can create a rule at block 810 using a user terminal, such as one of the user terminals 120, that may be in communication with a system, such as the system 110. The user can specify via the user terminal that the rule calls a transaction at block 820. The transaction, in turn, when performed by the system can create a task at block 830. Further, performing the task can result in the system sending a post/message at block 840 and constructing an initiative at block 860. The post/message can be additionally provided at block 850 to a social space of a user of a user terminal, such as one of the user terminals 120, and result in calling another transaction at block 870. The processing of the post/message by the social space can also result in a signal being forwarded at block 880.

In an embodiment, a signal can digitally link the operational activities of an instance of the processes of the preceding paragraph. The signal can connect and transport different instances of involved objects and can be used as a tag for manual activities. A user of a user terminal can, for example, monitor the signal via a "My Signals" area on a social space. In one implementation, the signal can result in the system implementing the following such that the below numbers correspond to the circled numbers in the diagram 800:

1. Create Signal
Rule=If M Then Do . . . .
M1, Date/Time, User. App
Link (Rule, Happ, User)
2. Update Signal
Activate Transaction Y
Parameter In (x, y, z)
Link (Transaction, Happ, User)
3. Update Signal
Task XY Activated
Task Info . . . .
Link (Task, User)
4. Update Signal
Post Sent
Post, Date/Time, User/SS
Link (Post)
5. Update Signal
SS Update
6. Update Signal
Create Initiative . . . .
7. Update Signal
Create Transaction . . . .
8. Update Signal
Forwarded To . . . .

In such an implementation, the activities performed by the system can be advantageously performed with a limited number of user interactions (for example, only two mouse clicks).

Example Computing System

Figure 9:
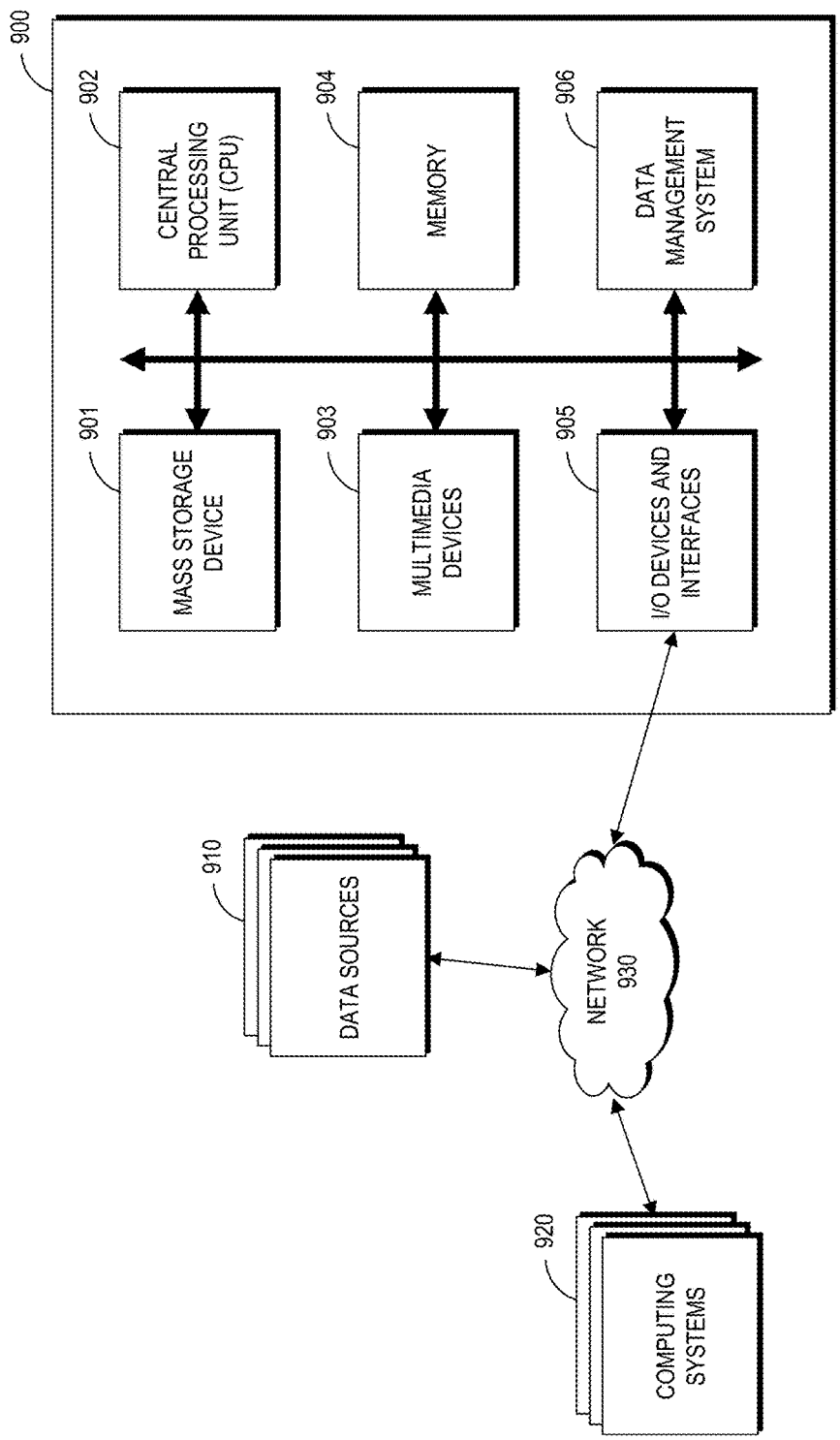
FIG. 9 is a block diagram depicting an embodiment of a computer hardware system configured to run software for implementing one or more embodiments described herein.

FIG. 9 is a block diagram depicting an embodiment of a computer hardware system 900 configured to run software for implementing one or more embodiments of the system 110, the user terminals 120, the administrator terminals 130, supplier systems 510, client systems 520, and object marketplace server 530 described herein.

In some embodiments, the computer clients, servers, systems, and/or terminals described above take the form of a computing system 900 illustrated in FIG. 9, which is a block diagram of one embodiment of a computing system that is in communication with one or more computing systems 920 and/or one or more data sources 910 via one or more networks 930. The computing system 900 including the data management system module 906 may be used to implement one or more of the systems and methods described herein. In addition, in one embodiment, the computing system 900 may be configured to manage access or administer a software application. While FIG. 9 illustrates one embodiment of a computing system 900, it is recognized that the functionality provided for in the components and modules of computing system 900 may be combined into fewer components and modules or further separated into additional components and modules.

In general, the word "module," as used herein, refers to logic embodied in hardware or firmware, or to a collection of software instructions, possibly having entry and exit points, written in a programming language, such as, for example, COBOL, CICS, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In one embodiment, the computing system 900 also comprises a mainframe computer suitable for controlling and/or communicating with large databases, performing high volume transaction processing, and generating reports from large databases. The computing system 900 also comprises a central processing unit ("CPU") 902, which may comprise a conventional microprocessor. The computing system 900 further comprises a memory 904, such as random access memory ("RAM") for temporary storage of information and/or a read only memory ("ROM") for permanent storage of information, and a mass storage device 901, such as a hard drive, diskette, or optical media storage device. Typically, the modules of the computing system 900 are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

The computing system 900 comprises one or more commonly available input/output (I/O) devices and interfaces 905, such as a keyboard, mouse, touchpad, and printer. In one embodiment, the I/O devices and interfaces 905 comprise one or more display devices, such as a monitor, that allows the visual presentation of data to a user. More particularly, a display device provides for the presentation of GUIs, application software data, and multimedia presentations, for example. In one or more embodiments, the I/O devices and interfaces 905 comprise a microphone and/or motion sensor that allow a user to generate input to the computing system 900 using sounds, voice, motion, gestures, or the like. In the embodiment of FIG. 9, the I/O devices and interfaces 905 also provide a communications interface to various external devices. The computing system 900 may also comprise one or more multimedia devices 903, such as speakers, video cards, graphics accelerators, and microphones, for example.

The computing system 900 may run on a variety of computing devices, such as, for example, a server, a Windows server, a Structure Query Language server, a Unix server, a personal computer, a mainframe computer, a laptop computer, a tablet computer, a cell phone, a smartphone, a personal digital assistant, a kiosk, an audio player, an e-reader device, and so forth. The computing system 900 is generally controlled and coordinated by operating system software, such as z/OS, Windows 95, Windows 98, Windows NT, Windows 2000, Windows XP, Windows Vista, Windows 7, Windows 8, Linux, BSD, SunOS, Solaris, Android, iOS, BlackBerry OS, or other compatible operating systems. In Macintosh systems, the operating system may be any available operating system, such as MAC OS X. In other embodiments, the computing system 900 may be controlled by a proprietary operating system. Conventional operating systems control and schedule computer processes for execution, perform memory management, provide file system, networking, and I/O services, and provide a user interface, such as a graphical user interface ("GUI"), among other things.

In the embodiment of FIG. 9, the computing system 900 is coupled to a network 930, such as a LAN, WAN, or the Internet, for example, via a wired, wireless, or combination of wired and wireless, communication link. The network 930 communicates with various computing devices and/or other electronic devices via wired or wireless communication links. In the embodiment of FIG. 9, the network 930 is communicating with one or more computing systems 920 and/or one or more data sources 910.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition a touch screen may act as a hybrid input/output device. In another embodiment, a user may interact with the system more directly such as through a system terminal connected to the score generator without communications over the Internet, a WAN, or IAN, or similar network.

In some embodiments, the system 900 may comprise a physical or logical connection established between a remote microprocessor and a mainframe host computer for the express purpose of uploading, downloading, or viewing interactive data and databases on-line in real time. The remote microprocessor may be operated by an entity operating the computer system 900, including the client server systems or the main server system, an/or may be operated by one or more of the data sources 910 and/or one or more of the computing systems 920. In some embodiments, terminal emulation software may be used on the microprocessor for participating in the micro-mainframe link.

In an embodiment, a user access point or user interface comprises a personal computer, a laptop computer, a tablet computer, an e-reader device, a cellular phone, a smartphone, a GPS system, a Blackberry® device, a portable computing device, a server, a computer workstation, a local area network of individual computers, an interactive kiosk, a personal digital assistant, an interactive wireless communications device, a handheld computer, an embedded computing device, an audio player, or the like.

In addition to the systems that are illustrated in FIG. 9, the network 930 may communicate with other data sources or other computing devices. The computing system 900 may also comprise one or more internal and/or external data sources. In some embodiments, one or more of the data repositories and the data sources may be implemented using a relational database, such as DB2, Sybase, Oracle, CodeBase and Microsoft® SQL Server as well as other types of databases such as, for example, a flat file database, an entity-relationship database, and object-oriented database, and/or a record-based database.

Selected Terminology

As used herein, the term "object," in addition to having its ordinary meaning, can refer to a data structure together with processing routines. The data structure can include a way of storing and organizing data. The processing routines can include one or more approaches for processing the data of the data structure, as well as other data. Example objects described herein can include communication objects, as well as contextual objects.

As used herein, the term "data measure," in addition to having its ordinary meaning, can refer to an intersection of categories of data dimensions having an associated numeric value or fact. The data dimensions can include categories, such as, products, regions, time or periods or the like, in some implementations. In one example, a data measure can be associated with the intersection of the categories of Product A, Region B, and Time Period C. Accordingly, a data measure can have a set of data dimension coordinates associated with the data measure that may uniquely identify the data measure within a multidimensional data structure, such as an OLAP cube.

As used herein, the term "metadata," in addition to having its ordinary meaning, can refer to data about data. For example, metadata can refer to the data of a contextual object that may itself be data about an associated data measure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied. The headings used herein are for the convenience of the reader only and are not meant to limit the scope of the inventions or claims.

Terms such as "substantially," "about," "approximately," or the like as used in referring to a relationship between two elements is intended to reflect not only an exact relationship but also variances in that relationship that may be due to various factors such as the effects of environmental conditions, common error tolerances, or the like. It should further be understood that although some values or other relationships may be expressed herein without a modifier, these values or other relationships may also be exact or may include a degree of variation due to various factors such as the effects of environmental conditions, common error tolerances, or the like. As one example, one or more factors can influence the real-time communication capabilities in the computer environments 100. For instance, the one or more factors can include a size of the infrastructure of the system 110, a size of the database(s) of the system 110, an amount of data stored in the database(s) of the system 110, a technology of the database(s) of the system 110, the speed of the network 108, and the processing speeds of the user terminals 120A and 120B and system 110.

Disjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Additionally, the skilled artisan will recognize that any of the above-described methods can be carried out using any appropriate apparatus. Further, the disclosure herein of any particular feature, aspect, method, property, characteristic, quality, attribute, element, or the like in connection with an embodiment can be used in all other embodiments set forth herein. For all of the embodiments described herein the steps of the methods need not be performed sequentially.

What is claimed is:

1. A computer-implemented method for facilitating collaboration between users of a plurality of user terminals around a data measure mapped to a multi-dimensional data model, the computer-implemented method comprising:
    receiving, by a computer system comprising hardware circuitry, a first communication object via a computer network from a first server, the first communication object comprising (i) first data measures mapped to a first multi-dimensional data model configured for access by online analytical processing (OLAP) applications, (ii) parameters indicative of coordinates of a plurality of data dimensions of the first multi-dimensional data model that uniquely identify the first data measures within the first multi-dimensional data model, and (iii) first instructions for automatically exchanging with other objects data including the first data measures;
    retrieving, by the computer system, a second data measure from an electronic data storage in communication with the computer system according to coordinates of a plurality of data dimensions of a second multi-dimensional data model that uniquely identify the second data measure within the second multi-dimensional data model, the second multi-dimensional data model configured for access by the OLAP applications;
    determining, by the computer system, an output data measure using the second data measure and at least one of the first data measures;
    generating, by the computer system, a second communication object comprising (i) the output data measure, (ii) a parameter indicative of coordinates of a plurality of data dimensions of a second multi-dimensional data model that uniquely identify the output data measure within the second multi-dimensional data model, and (iii) second instructions for automatically exchanging with the other objects data including the output data measure; and
    transmitting, by the computer system, the second communication object via the computer network to a second server, wherein receipt of the second communication object by the second server causes the second server to determine another output data measure using the output data measure and a third data measure retrieved from another electronic data storage in communication with the second server, the third data measure retrieved according to coordinates of a plurality of data dimensions of a third multi-dimensional data model that uniquely identify the third data measure within the third multi-dimensional data model, the third multi-dimensional data model configured for access by the OLAP applications.

2. The computer-implemented method of claim 1, further comprising integrating, by the computer system, the first communication object with another object used by the computer system to process the second data measure.

3. The computer-implemented method of claim 2, wherein said integrating comprises automatically correlating, by the computer system, data mapping of the first data measures with data mappings of the another object.

4. The computer-implemented method of claim 3, wherein said automatically correlating is performed by the computer system based at least on the first instructions.

5. The computer-implemented method of claim 2, wherein said integrating is performed by the computer system so that a value of at least one of the first data measures automatically initiates a process by the another object.

6. The computer-implemented method of claim 1, further comprising requesting, by the computer system, updated values for the first data measures from the first server.

7. The computer-implemented method of claim 1, further comprising receiving, by the computer system, updated values for at least some of the first data measures as a data push from the first server.

8. The computer-implemented method of claim 1, further comprising transmitting, by the computer system, an updated value for the output data measure to the second server in response to a request from the second server for the updated value for the output data measure.

9. The computer-implemented method of claim 1, further comprising transmitting, by the computer system, an updated value for the output data measure as a data push to the second server.

10. The computer-implemented method of claim 1, wherein said transmitting comprises simultaneously or consecutively transmitting, by the computer system, the second communication object to a plurality of servers including the second server, wherein receipt of the second communication object by each of the plurality of servers causes each server to determine another output data measure using the output data measure.

11. The computer-implemented method of claim 1, further comprising:
    generating, by the computer system, a user interface comprising a value of the output data measure; and
    outputting, by the computer system, the user interface to a display of a terminal for presentation on a screen of the display to a viewer.

12. The computer-implemented method of claim 11, wherein the user interface comprises an indication that the computer system received the output data measure from the first server, the indication being positioned in juxtaposition to the value of the output data measure.

13. The computer-implemented method of claim 11, further comprising generating and outputting a social space for the viewer, the user interface being part of the social space.

14. The computer-implemented method of claim 1, wherein the second multi-dimensional data model comprises at least three dimensions, and the output data measure and the second data measure are stored in the electronic data storage in a relational database structure.

15. The computer-implemented method of claim 1, wherein the first communication object and the second communication object each comprises a data structure and processing routines.

* * * * *